United States Patent
Choi

(10) Patent No.: US 8,331,407 B2
(45) Date of Patent: Dec. 11, 2012

(54) APPARATUS AND METHOD FOR PROVIDING WHITE BOARD SERVICE IN MOBILE COMMUNICATION SYSTEM

(75) Inventor: Mi-Ra Choi, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 315 days.

(21) Appl. No.: 12/756,259

(22) Filed: Apr. 8, 2010

(65) Prior Publication Data

US 2010/0260209 A1 Oct. 14, 2010

(30) Foreign Application Priority Data

Apr. 8, 2009 (KR) .................... 10-2009-0030255

(51) Int. Cl.
*H04J 3/02* (2006.01)
*G06F 15/16* (2006.01)

(52) U.S. Cl. ............... 370/542; 370/537; 709/231
(58) Field of Classification Search .................. None
See application file for complete search history.

(56) References Cited

U.S. PATENT DOCUMENTS

| | | | |
|---|---|---|---|
| 2008/0186952 A1* | 8/2008 | Lin et al. .................. | 370/352 |
| 2009/0027481 A1* | 1/2009 | Joung et al. .............. | 348/14.02 |
| 2009/0225684 A1* | 9/2009 | Cho et al. ................. | 370/259 |
| 2010/0277562 A1* | 11/2010 | Jabri et al. ................ | 348/14.01 |
| 2011/0181682 A1* | 7/2011 | Belling et al. ............ | 348/14.02 |
| 2011/0216708 A1* | 9/2011 | Ling ........................ | 370/328 |
| 2012/0050452 A1* | 3/2012 | Lee et al. .................. | 348/14.07 |

* cited by examiner

Primary Examiner — Clemence Han
(74) Attorney, Agent, or Firm — Cha & Reiter, LLC

(57) ABSTRACT

An apparatus and a method for providing a white board service in a mobile communication system are provided, wherein a bit stream received from a counterpart node is demuxed into data of a logic channel and data of a control channel using a demuxing protocol. The demuxed data is decoded for output.

20 Claims, 6 Drawing Sheets

APPARATUS AND METHOD FOR PROVIDING WHITE BOARD SERVICE IN MOBILE COMMUNICATION SYSTEM

CLAIM OF PRIORITY

This application claims the benefit under 35 U.S.C. §119(a) of a Korean patent application filed in the Korean Intellectual Property Office on Apr. 8, 2009 and assigned Serial No. 10-2009-0030255, the entire disclosure of which is hereby incorporated by reference.

BACKGROUND OF THE INVENTION

1. Field of the Invention

The present invention relates to an apparatus and a method for providing an electronic white board service using an H.324m protocol in a mobile communication system.

2. Description of the Related Art

An H.324m protocol is a real-time streaming support protocol for providing a multimedia service such as voices, images, data, etc. via a circuit switched (CS) wireless network, and is predominantly used in a video phone application.

Generally, an electronic white board has been used to share conference contents through writing thereon. A white board service enables figure drawing and document editing in dual directions on a window, which is shared by two or more terminals. In the case where N persons in a conference room write on a white board, contents written on the white board is rapidly captured and transferred to remotely located computers for sharing.

In addition, voice contents are captured using a microphone and audios having directionality information are transmitted to the remotely located persons. The remotely located persons participate in the conference through audios reproduced from the speaker in the conference room.

Furthermore, in the white board service, the remotely located person may participate in the conference by writing comments at the captured white board frame. The white board frame where the comments have been written are displayed for viewing by a remotely located person.

However, currently, there is no proper standard for providing the above-described white board service. Therefore, a standardized transmission protocol to be shared by nodes that use the white board is needed to better facilitate the white board service.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for providing a white board service in a mobile communication system.

Another aspect of the present invention is to provide an apparatus and a method for providing a white board service using a standardized protocol.

In accordance with an aspect of the present invention, a method for receiving data for a white board service in a mobile communication system includes demuxing a bit stream received from a counterpart node into data of a logic channel and data of a control channel using a demuxing protocol, decoding the demuxed data, and outputting the decoded data.

In accordance with another aspect of the present invention, a method for transmitting data for a white board service in a mobile communication system includes adding up existing input data and input data, encoding the added data, muxing the encoded data and data of a control channel into a bit stream using a first communication protocol, and transmitting the bit stream to a counterpart node.

In accordance with still another aspect of the present invention, an apparatus for receiving data for a white board service in a mobile communication system includes a modem for communicating with a counterpart node, and a controller for demuxing a bit stream received from the counterpart node via the modem into data of a logic channel and data of a control channel using a demuxing protocol, decoding the demuxed data, and outputting the decoded data.

In accordance with yet another aspect of the present invention, an apparatus for transmitting data for a white board service in a mobile communication system includes a controller for adding up existing input data and input data, encoding the added data, muxing the encoded data and data of a control channel into a bit stream using a first communication protocol, and a modem for transmitting the bit stream to a counterpart node.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, exemplary embodiments of the present invention provide an apparatus and a method for providing an electronic white board service in a mobile communication system.

Figure 1:
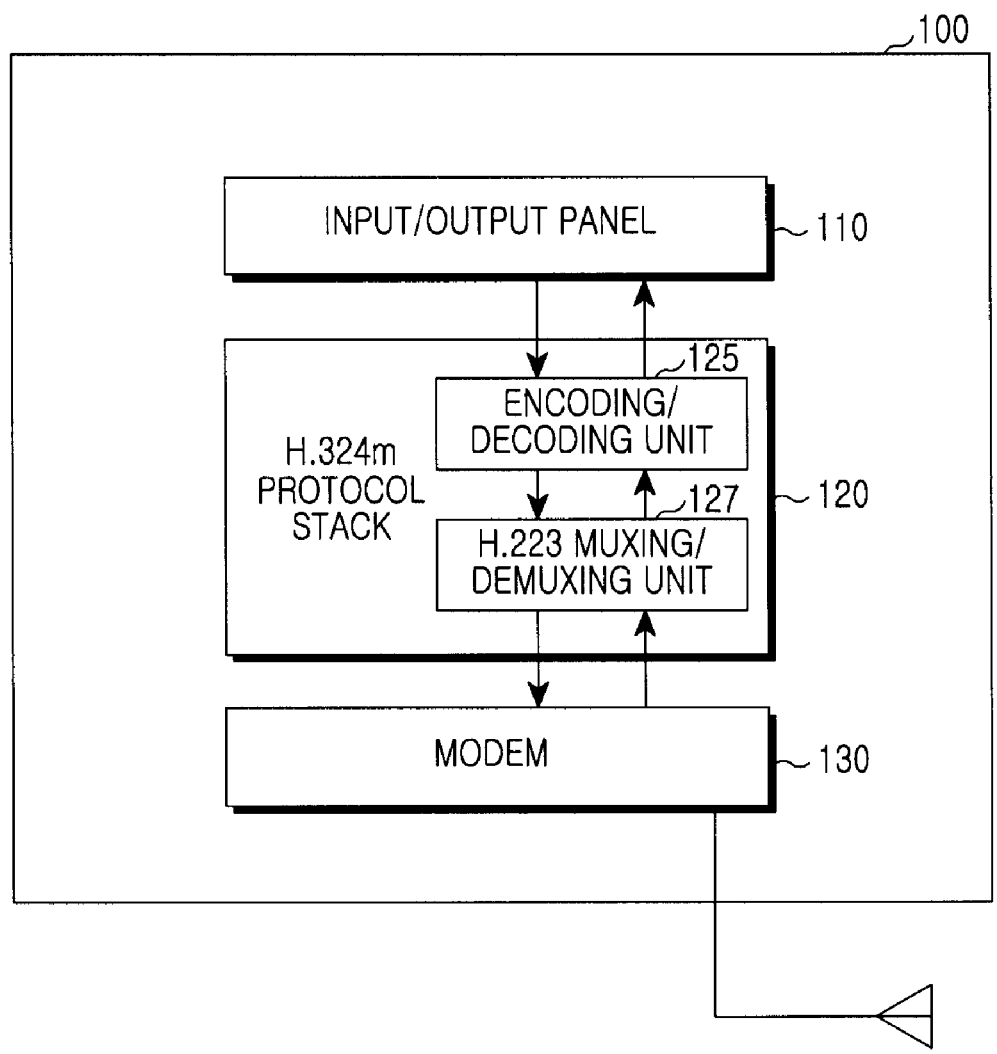
FIG. 1 is a block diagram illustrating an apparatus for providing a white board service according to an exemplary embodiment of the present invention.

FIG. 1 is a block diagram illustrating an apparatus for providing an electronic white board service according to an exemplary embodiment of the present invention.

Referring to FIG. 1, the apparatus 100 includes an input/output panel 110, an H.324m protocol stack 120, and a modem 130. Though not shown, the apparatus 100 additionally includes a controller for controlling the apparatus 100, a storage, and a speaker.

The input/output panel 110 performs an input/output function of a white board. That is, when receiving an input from a user, the input/output panel 110 converts the input into digital data, and provides the same to an encoding/decoding unit 125 of the H.324m protocol stack 120. Here, existing displayed data and newly input data are added up at the input/output panel 110 and provided to the encoding/decoding unit 125.

In addition, the input/output panel 110 displays screen data provided by the encoding/decoding unit 125. When voice data is provided by the encoding/decoding unit 125, the voice data is reproduced via the speaker. The input/output panel 110 may be a display panel including a touch panel in a mobile communication terminal, and may be an external touch screen connected to the mobile communication terminal.

The H.324m protocol stack 120 is used in order to provide an electronic white board service. Here, an H.223 protocol is used for muxing/demuxing, and an H.245 protocol is used for signaling.

The encoding/decoding unit 125 encodes data provided by the input/output panel 110 according to an encoding scheme by an H.324m protocol, and provides the encoded data to an H.223 muxing/demuxing unit 127. Alternatively, the encoding/decoding unit 125 decodes data received from the H.223 muxing/demuxing unit 127 according to a decoding scheme by the H.324m protocol.

The H.223 muxing/demuxing unit 127 muxes data received from the encoding/decoding unit 125 according to the H.223 protocol, and provides the same to the modem 130. Alternatively, the H.223 muxing/demuxing unit 127 demuxes data provided from the modem 130 according to the H.223 protocol and provides the same to the encoding/decoding unit 125.

The modem 130 modulates data provided from the 11.223 muxing/demuxing unit 127 according to a communication protocol, and transmits the same to a base station. Alternatively, the modem 130 demodulates data received from the base station according to a communication protocol, and provides the same to the H.223 muxing/demuxing unit 127.

The H.223 protocol, that is, the H.223 muxing/demuxing unit 127 is a protocol for performing muxing/demuxing and includes a multiplexing layer and an adaptation layer.

The multiplexing layer generates data of a logic channel and a control channel in the form of one bit stream transmittable in a physical layer. The adaptation layer is in charge of error handing of a MUX-Protocol Data Unit (PDU) and sequence numbering of a PDU.

Audio/video (captured video frame) generated during an electronic white board service is encoded using a codec negotiated in advance, and then generated as one bit stream together with other control messages at the multiplexing layer.

In alternate embodiment, a controller may perform a function of the H.324m protocol stack 120. Further, in actual realization of a product, all or some of the functions of the H.324m protocol stack 120 may be processed by the controller.

Figure 2:
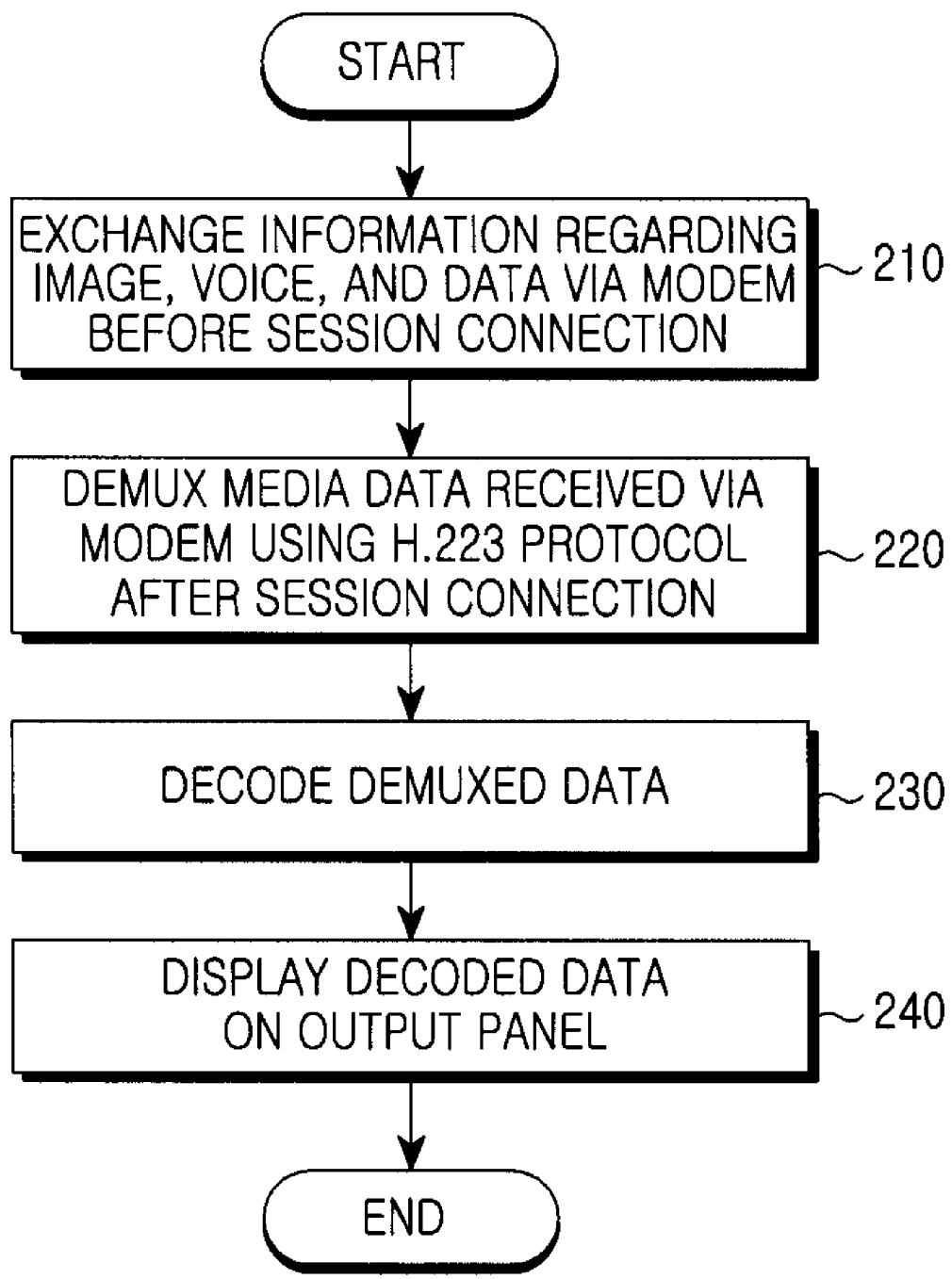
FIG. 2 is a flowchart illustrating an operation process including a session connection process during data reception according to an exemplary embodiment of the present invention.

FIG. 2 is a flowchart illustrating an operation process including a session connection process during data reception according to an exemplary embodiment of the present invention.

Referring to FIG. 2, before session connection, an apparatus (including a mobile communication terminal) using an electronic white board service exchanges information (particularly codec information) regarding images, voices, and data for the white board service with a counterpart node via a modem in step 210. This step is related to determination of a codec type of image and voice data used for a white board function. After that, a session connection process is performed.

The above processes include audio/video capability exchange process between two terminals. A primary function of step 210 includes exchanging audio/video capability, determining a terminal that would serve as a master or a slave, and performing setting and release of a logic channel for data transmission.

Therefore, the exchanging of audio/video capability to be used in the white board service is performed at this point, and the logic channel for data transmission is also set. Further, the type of a codec to be used is also determined at this point.

After session connection, media data received, via the modem, is demuxed using an H.223 protocol in step 220, and the demuxed data is decoded in step 230. A codec determined before the session connection is used for the decoding process.

The decoded data is displayed on an output panel in step 240. When there is voice data, the data is output via a speaker.

The above process is updated in real-time, and voice information together with images may be provided using the H.223 protocol. In this case, synchronization between the images and voices is guaranteed by the protocol.

Figure 3:
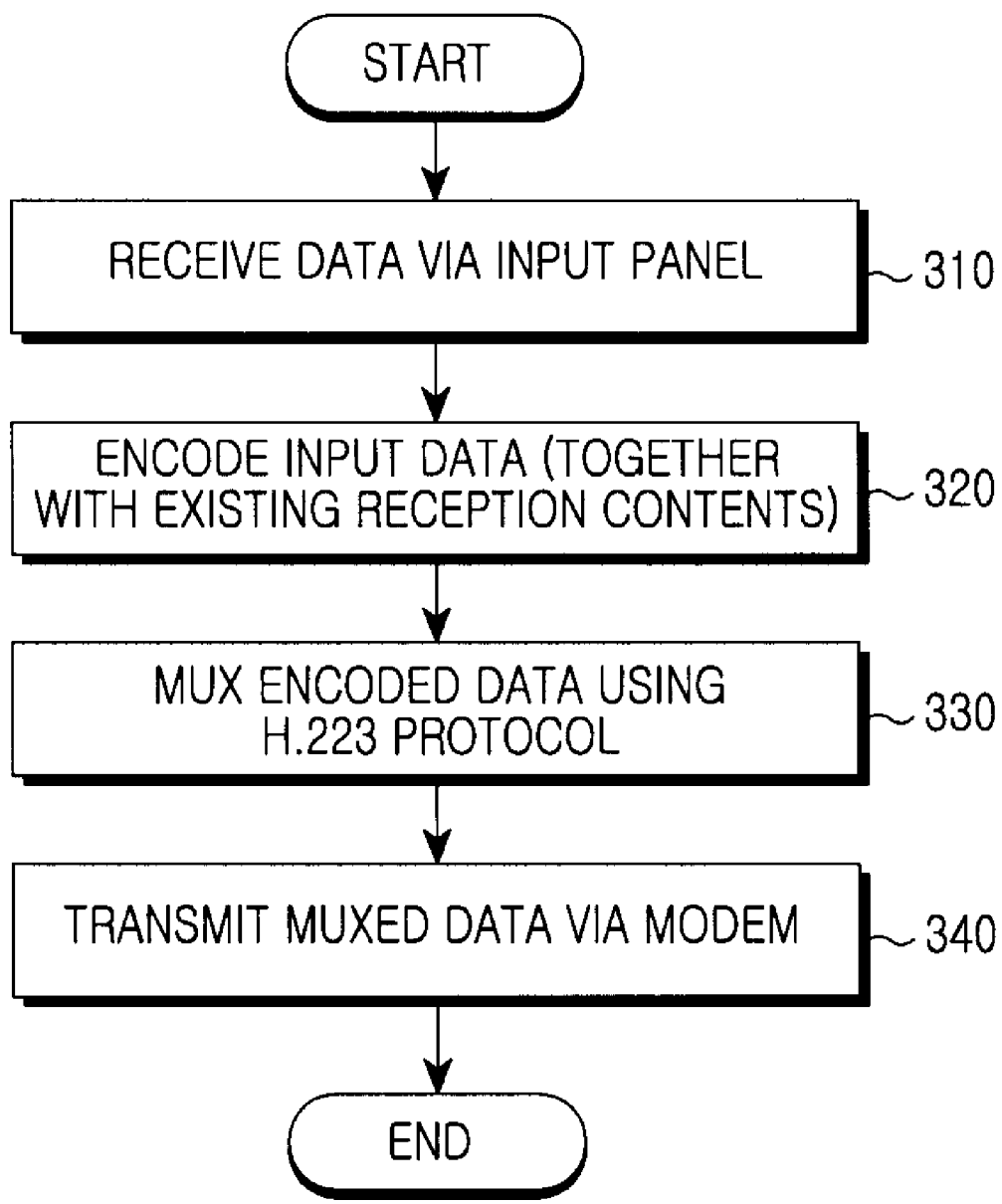
FIG. 3 is a flowchart illustrating an operation process during data transmission according to an exemplary embodiment of the present invention.

FIG. 3 is a flowchart illustrating an operation process during data transmission according to an exemplary embodiment of the present invention.

Referring to FIG. 3, after the establishment of session connection, an apparatus (including a mobile communication terminal) for a white board service receives data via an input panel in step 310. When there is a voice input, the apparatus receives the data via a microphone. The input data is provided to an encoding/decoding module for encoding. In this case, existing displayed contents are also provided together.

The input data is encoded in step 320. In this case, existing reception contents, that is, contents displayed on an output panel are encoded together.

The encoded data is muxed using an H.223 protocol in step 330.

A codec determined before session connection is used for the encoding process. The muxing process is a process for adding up image data and voice data to be transmitted as one data.

The muxed data is transmitted via a modem in step 340.

The above process is updated in real-time, and voice information together with images may be provided using the H.223 protocol. In this case, synchronization between the images and voices is guaranteed by the protocol.

Figure 4:
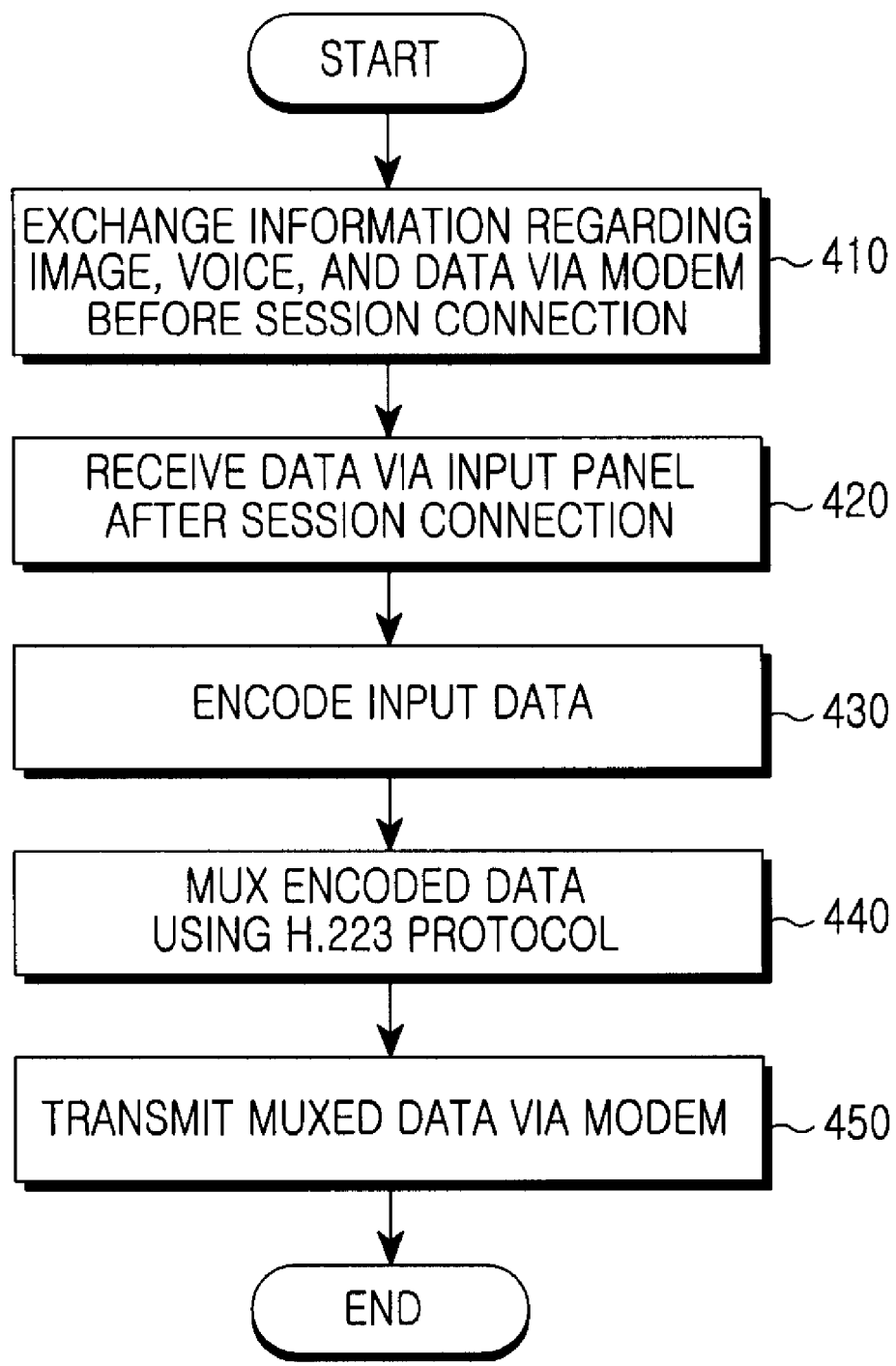
FIG. 4 is a flowchart illustrating an operation process including a session connection process during data transmission according to an exemplary embodiment of the present invention.

FIG. 4 is a flowchart illustrating an operation process including a session connection process during data transmission according to an exemplary embodiment of the present invention.

Referring to FIG. 4, before session connection, an apparatus (including a mobile communication terminal) using an electronic white board service exchanges information regarding images, voices, and data for the white board service with a counterpart node via a modem in step 410. This step is related to determination of a codec type of image data used for a white board function. After that, a session connection process is performed.

The above processes include audio/video capability exchange process between two terminals. A primary function includes exchanging audio/video capability, determining a terminal that would serve as a master or a slave, and performing setting and releasing of a logic channel for data transmission.

Therefore, the exchanging of audio/video capability to be used in the white board service is performed at this point, and the logic channel for data transmission is also set. Further, a type of a codec to be used is also determined at this point.

After session connection, the apparatus receives data via an input panel in step 420. At this point, when there is a voice input, the apparatus receives the data via a microphone. The input data is provided to an encoding/decoding module for encoding. In this case, existing displayed contents are also provided together.

The input data is encoded in step 430. In this case, existing reception contents, that is, contents displayed on an output panel are encoded together, and the encoded data is muxed using an H.223 protocol in step 440.

A codec determined before the session connection is used for the encoding process. The muxing process is a process for adding up image and voice data transferred via a network as one data. The muxed data is transmitted via the modem in step 450.

The above process is updated in real-time, and voice information together with images may be provided using an H.223 protocol. In this case, synchronization between the images and voices is guaranteed by the protocol.

Figure 5:
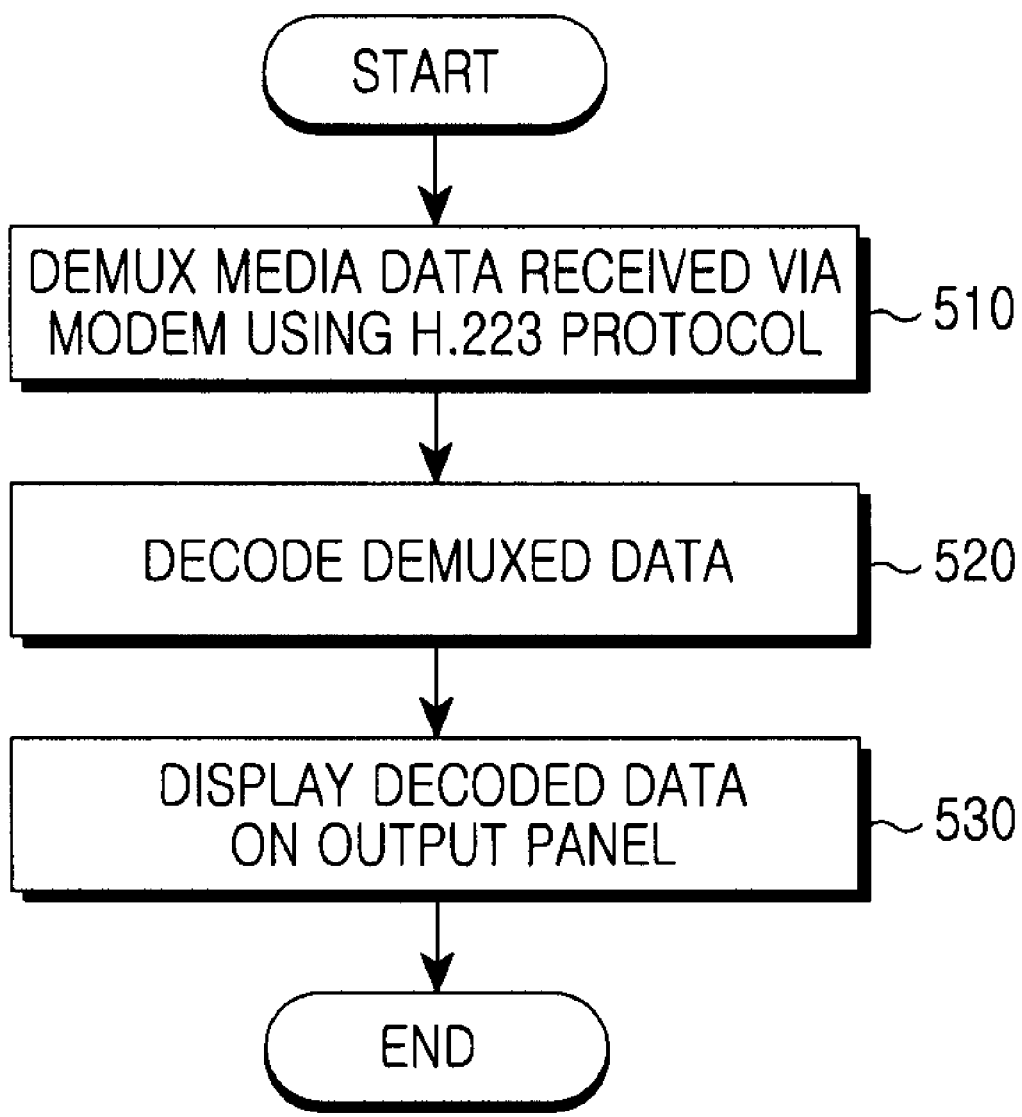
FIG. 5 is a flowchart illustrating an operation process during data reception according to an exemplary embodiment of the present invention.

FIG. 5 is a flowchart illustrating an operation process during data reception according to an exemplary embodiment of the present invention.

Referring to FIG. 5, after the completion of session connection, an apparatus (including a mobile communication terminal) using an electronic white board service demuxes media data received via a modem using an H.223 protocol in step 510, and decodes the demuxed data in step 520. A codec determined before the session connection is used for the decoding process.

The decoded data is displayed on an output panel in step 530. When there is voice data, the voice data is output via a speaker.

The above process is updated in real-time, and voice information together with images may be provided using an H.223 protocol. In this case, synchronization between the images and voices is guaranteed by the protocol.

Figure 6:
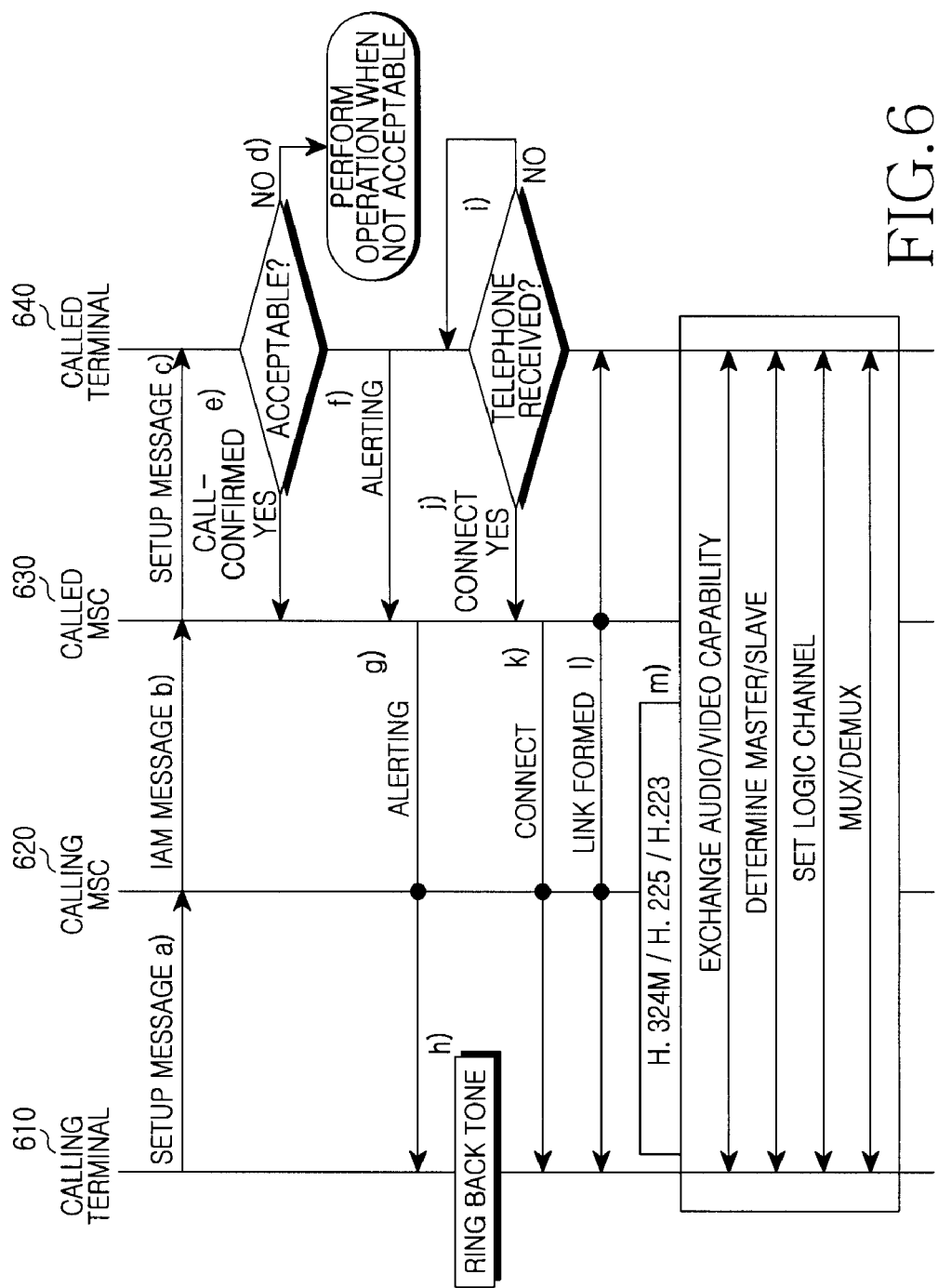
FIG. 6 is a view illustrating an operation process during data transmission/reception according to an exemplary embodiment of the present invention.

FIG. 6 is a view illustrating an operation process during data transmission/reception according to an exemplary embodiment of the present invention.

Referring to FIG. 6, an operation during data transmission/reception is described together with an operation of an H.324m protocol. A calling terminal 610 transmits a 'SETUP' message (Technical Specification (TS) 04.08 standard) to a calling Mobile Switching Center (MSC) 620 (generally, including a Visitor Location Register (VLR)) in step a).

The calling MSC 620 transmits an 'Initial Address Message (IAM, ISDN (Integrated Services Digital Network) User Part (ISUP) standard) to a called MSC 630 in step b).

The called MSC 630 determines a dialed number and transmits a 'SETUP' message to a relevant called terminal 640 in step c).

The called terminal 640 determines information included in the 'SETUP' message and capability of the called terminal 640, and when determining that a received call is not acceptable, performs an operation corresponding to the case where a call is not acceptable in step d).

The called terminal 640 determines information included in the 'SETUP' message and capability of the called terminal 640, and when determining that a received call is acceptable, transmits a 'CALL-CONFIRMED' message to the called MSC 630 in step e).

The called terminal 640 transmits an 'ALERTING' message to the called MSC 630 in step f) and informs that a telephone ring informing call reception rings in the called terminal 640.

Here, the called MSC 630 transfers an 'ALERTING' message to the calling terminal 610 by way of the calling MSC 620 in step g). From this point, a ring-back tone starts to ring in the calling terminal in step h). The ring-back tone denotes a telephone tone heard by the calling terminal 610, informing that a telephone bell rings in the called terminal 640.

When a called subscriber responds to a call in step i), the called terminal 640 transmits a 'CONNECT' message to the called MSC 630 in step j). When the 'CONNECT' message is transferred to the calling terminal 610 from the called MSC 630 by way of the calling MSC 620 in step k), a link is formed between the two terminals in step l). From this point, a call control is possible using H.223/H.245 of a 3G-324M protocol in step m).

Here, H.223 is a protocol for muxing/demuxing, and H.245 is a protocol for transmitting a signaling message. After setting of an H.324m protocol is completed, a message for call control between terminals is exchanged using the H.245 protocol. As stated earlier, a primary function of message exchange for call control, that is, a primary function of signaling message exchange includes exchanging audio/video capability, determining a terminal that would serve as a master or a slave, and performing setting and releasing of a logic channel for data transmission.

Therefore, the exchanging of audio/video capability to be used in the white board service is performed, the logic channel for data transmission is set, and a codec type to be used is determined.

In addition, while a call is maintained, with an H.245 signal channel always opened separately from a data channel, a user input (user inputs a signal via a keypad on a terminal) such as a Dual Tone Multiple Frequency (DTMF) is transmitted. The H.223 protocol is a protocol for performing muxing/demuxing and includes a multiplexing layer and an adaptation layer. The multiplexing layer generates data of a logic channel and a control channel in the form of one bit stream transmittable in a physical layer. The adaptation layer is in charge of error handing of a MUX-Protocol Data Unit (PDU) and sequence numbering of a PDU. Audio/video (captured video frame) generated during a white board service is encoded using a codec negotiated in advance, and then generated as one bit stream together with other control messages at the multiplexing layer.

An exemplary embodiment of the present invention may provide a white board service using a standardized protocol and does not require a separate server. Moreover, the present invention provides a service to all mobile communication subscribers using an existing service network, and provides voice and image data simultaneously without a separate synchronization process. In addition, since an exemplary embodiment of the present invention uses the same protocol stack as that of a video telephone, the service may be used even during telephone communication.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for receiving data using an electronic white board service in a mobile communication system, the method comprising:
   demuxing, by a controller, a bit stream received from a counterpart node into data of a logic channel and data of a control channel using a demuxing protocol;
   decoding, by the controller, the demuxed data; and
   outputting, by the controller, the decoded data;
   wherein the decoded data comprises voice and image data provided simultaneously without a separate synchronization process, and providing the electronic whiteboard service enabling figure drawing and document editing in dual directions on a window shared by two or more mobile communication terminals using a same protocol stack of a video telephone in which the whiteboard service is operable during telephone communication.

2. The method of claim 1, further comprising exchanging data using a signaling protocol when exchanging the data of the control channel with the counterpart node.

3. The method of claim 2, further comprising, during the exchanging data, determining a codec type to be used.

4. The method of claim 2, wherein the demuxing protocol comprises an H.223 protocol, and the signaling protocol comprises an H.245 protocol.

5. The method of claim 1, further comprising, before the demuxing, performing at least one of exchanging audio/video capability for providing the white board service with the counterpart node, determining a master/slave, and setting a logic channel for transmitting data.

6. A method for transmitting data using an electronic whiteboard service in a mobile communication system, the method comprising:
   adding up, by a controller, displayed data on an output panel and input data;
   encoding, by the controller, the added data;
   muxing, by the controller, the encoded data and data of a control channel into a bit stream using a first communication protocol; and
   transmitting, by a modem, the bit stream to a counterpart node;
   wherein the encoded data comprises voice and image data provided simultaneously without a separate synchronization process, and providing the electronic whiteboard service enabling figure drawing and document editing in dual directions on a window shared by two or more mobile communication terminals using a same protocol stack of a video telephone in which the whiteboard service is operable during telephone communication.

7. The method of claim 6, further comprising exchanging data using a signaling protocol when exchanging the data of the control channel with the counterpart node.

8. The method of claim 7, further comprising, during the exchanging data, determining a codec type to be used.

9. The method of claim 7, wherein a protocol for the muxing comprises an H.223 protocol, and the signaling protocol comprises an H.245 protocol.

10. The method of claim 6, further comprising, before the encoding, performing at least one of exchanging audio/video capability for providing the white board service with the counterpart node, determining a master/slave, and setting a logic channel for transmitting data.

11. An apparatus for receiving data using an electronic white board service in a mobile communication system, the apparatus comprising:
    a modem for communicating with a counterpart node; and
    a controller for demuxing a bit stream received from the counterpart node via the modem into data of a logic channel and data of a control channel using a demuxing protocol, decoding the demuxed data, and outputting the decoded data;
    wherein the decoded demuxed data comprises voice and image data provided simultaneously without a separate synchronization process, and
    wherein the controller provides a whiteboard service enabling figure drawing and document editing in dual directions on a window shared by two or more mobile communication terminals using a same protocol stack of a video telephone in which the whiteboard service is operable during telephone communication.

12. The apparatus of claim 11, wherein the controller exchanges data using a signaling protocol when exchanging the data of the control channel with the counterpart node.

13. The apparatus of claim 11, wherein the controller determines a codec type to be used when exchanging the data.

14. The apparatus of claim 12, wherein the demuxing protocol comprises an H.223 protocol, and the signaling protocol comprises an H.245 protocol.

15. The apparatus of claim 11, wherein before the demuxing, the controller performs at least one of exchanging audio/video capability for providing the white board service with the counterpart node, determining a master/slave, and setting a logic channel for transmitting data.

16. An apparatus for transmitting data using an electronic whiteboard service in a mobile communication system, the apparatus comprising:
    a controller for adding up displayed data on an output panel and input data, encoding the added data, muxing the encoded data and data of a control channel into a bit stream using a first communication protocol; and
    a modem for transmitting the bit stream to a counterpart node;

wherein the decoded data comprises first type input data and second type input data provided simultaneously without a separate synchronization process, and providing a whiteboard service enabling figure drawing and document editing in dual directions on a window shared by two or more mobile communication terminals using a same protocol stack of a video telephone in which the whiteboard service is operable during telephone communication.

17. The apparatus of claim 16, wherein the controller exchanges data using a signaling protocol when exchanging the data of the control channel with the counterpart node.

18. The apparatus of claim 17, wherein a protocol for the muxing comprises an H.223 protocol, and the signaling protocol comprises an H.245 protocol.

19. The apparatus of claim 16, wherein the controller determines a codec type to be used when exchanging the data.

20. The apparatus of claim 16, wherein before the encoding, the controller performs at least one of exchanging audio/video capability for providing the white board service with the counterpart node, determining a master/slave, and setting a logic channel for transmitting data.

* * * * *